Figures 4, 5:
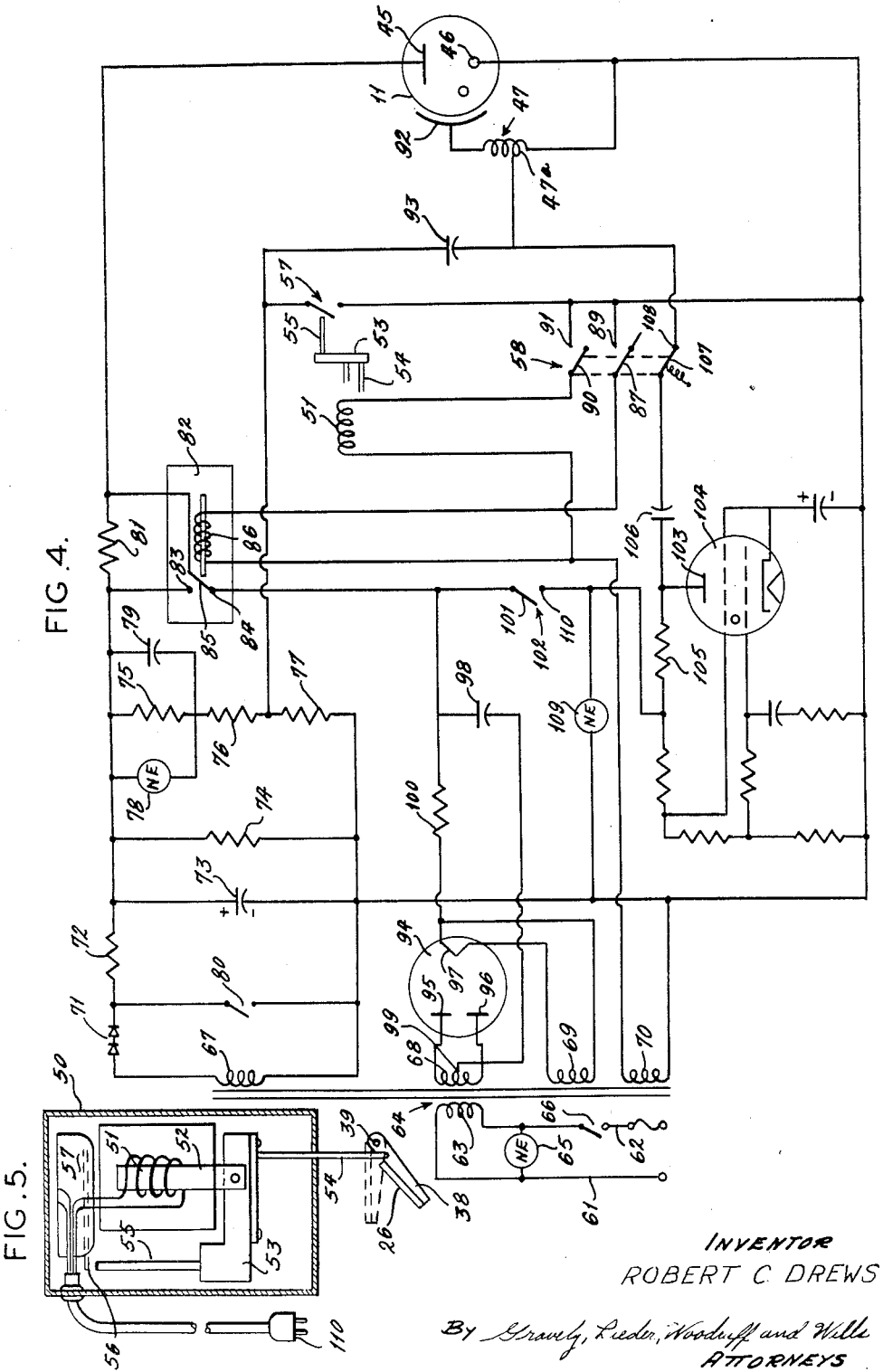

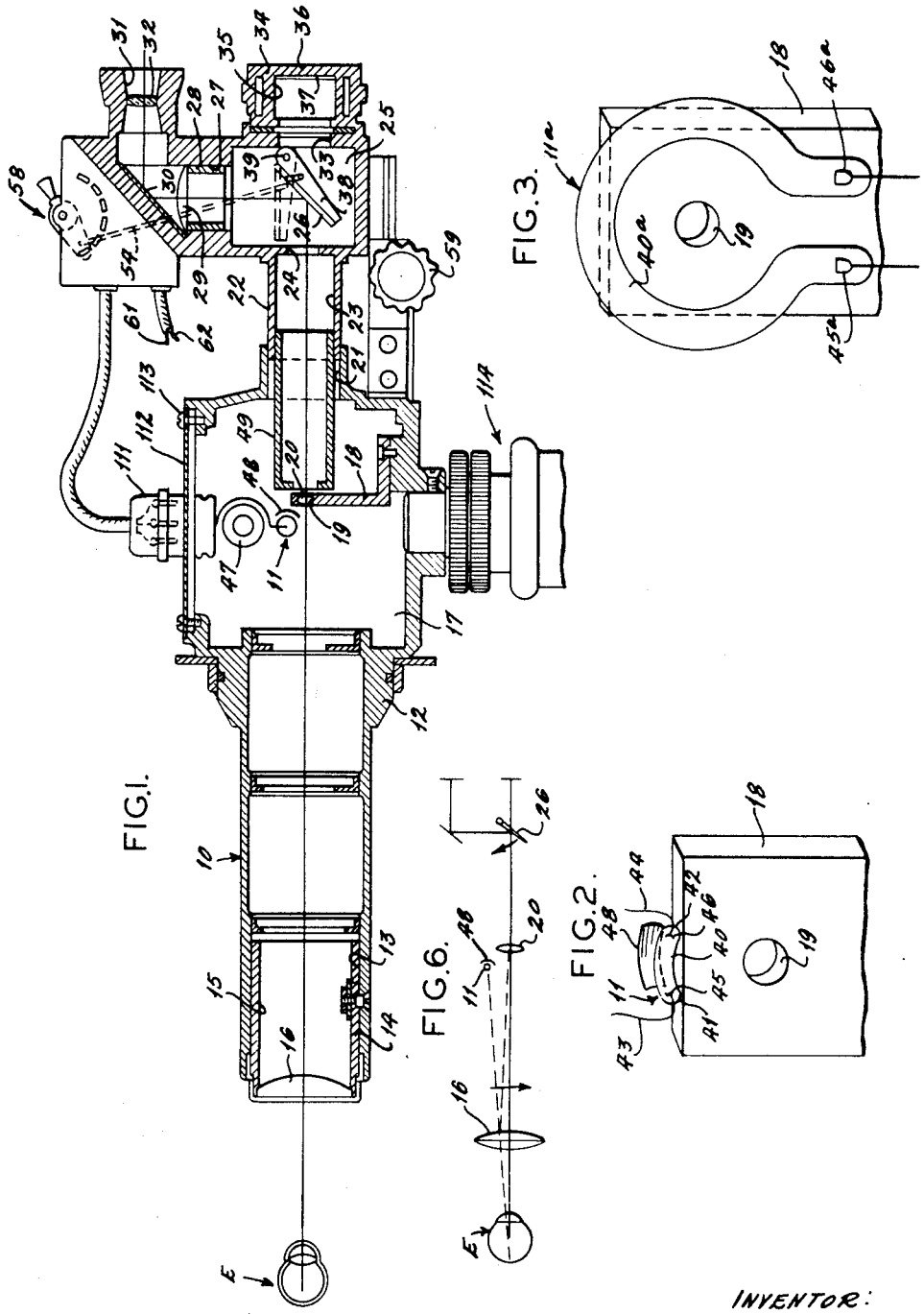

Aug. 2, 1960    R. C. DREWS    2,947,216
RETINAL CAMERA
Filed Sept. 15, 1955    2 Sheets-Sheet 2

INVENTOR
ROBERT C. DREWS
By Gravely, Lieder, Woodruff and Wille
ATTORNEYS

United States Patent Office 2,947,216
Patented Aug. 2, 1960

2,947,216

RETINAL CAMERA

Robert C. Drews, 4510 McKinley Ave., St. Louis 10, Mo.

Filed Sept. 15, 1955, Ser. No. 534,494

5 Claims. (Cl. 88—20)

The present invention relates generally to cameras and particularly to an electronic light source for use with a camera of a type for taking pictures of the fundus of an eye.

The history of photographic attempts at taking pictures of the fundus oculi or the inner regions of a human eye is fairly broad and includes devices of varying scope. However, no dependable device has heretofore been devised which gives consistently good results and yet can be operated by a person having only general familiarity with photographic principles.

No provision has yet been made in a fundus camera for an electronic flash-type light source that is positioned within the camera near to the optical axis eliminating the need for intermediary light focusing means. Furthermore, no provision has been made for flickering an electronic light source in a camera to produce suitable light intensity for accurately focusing the camera prior to taking the picture, nor has provision been made that enables an unskilled operator familiar only with basic photographic principles to take good pictures of the eye fundus.

A principal object of the present invention is the provision of an electronic light source mounted on or near the optical axis in a fundus camera so that no intermediary light directing means is necessary.

Another major object of the present invention is to provide a single electronic light source for a camera to illuminate a subject both for focusing and for taking the picture.

Another object of the present invention is to provide a light source for a camera that eliminates heating of the camera parts.

Another object of the present invention is to provide an electronic light for a fundus camera that operates at greatly increased speed so that pictures will not be blurred by motions of the subject or camera.

Another object of the present invention is to provide a relatively inexpensive fundus camera by reducing the number of light directing parts in the optical system and by eliminating the heat absorbing elements and the complex shutter formerly used.

Still another object of the present invention is to provide a light source for a camera that does not require adjustment because of wear or changing intensity of the source itself.

A further object of the present invention is to provide a fundus camera that may be satisfactorily operated by a single relatively unskilled operator having a general understanding only of ordinary photographic principles.

These and other objects and advantages will become apparent hereinafter.

Briefly, the present invention includes a fundus camera having an electronic light source positioned inside the camera housing on or near the optical axis so that the camera lenses may be used as the sole means for directing the light from the light source to the subject and from the subject to the film and the focusing means. Included in the invention is a circuit that operates the electronic light source at high light intensity for taking pictures and provides means for flickering the light source at lower intensity for accurate focusing.

The invention also consists in the parts and in the arrangements and combinations of parts hereinafter described and claimed. In the accompanying drawings which form a part of this specification and wherein like numerals refer to like parts wherever they occur:

Fig. 1 is a cross sectional and side elevational view of a fundus camera embodying the present invention which includes an electronic light source, Fig. 2 is an enlarged view of the electronic light source, Fig. 3 is an enlarged view showing a circular electronic light source, Fig. 4 is a diagrammatic wiring diagram of an electrical circuit that may be used with the fundus camera shown in Fig. 1, Fig. 5 is an enlarged plan view of a typical solenoid arrangement for use with the fundus camera, and Fig. 6 is a simplified schematic view of the optical system of the inventive camera.

Referring to the drawings more particularly by reference numerals, the number 10 refers to a fundus camera including an electronic light source or lamp 11. Referring to Fig. 1, the fundus camera 10 includes a camera housing 12 positioned for taking pictures of a fundus oculi E to the left of the camera 10. Adjustably positioned in a bore 13 in the left end of the camera housing 12 is a forward camera lens housing 14 which has a bore 15 in alignment with the bore 13 and in which is mounted a forward camera lens or opthalmoscope lens 16. The optical axis of the lens 16 is aligned axially with the bores 13 and 15 and extends between the fundus oculi E and the inside of the camera 10.

The bore 13 extends to the right in the housing 12 into an enlarged camera chamber 17. Attached to the floor of the chamber 17 is a rear camera lens housing 18 which extends upwardly in the chamber 17 and has an aperture 19 in axial alignment with bores 13 and 15. The aperture 19 positions a rear camera lens 20. Extending to the right from the chamber 17 is a bore 21 which receives a tubular sleeve 22. A bore 23 in the sleeve 22 is aligned with the bore 21 and extends rightwardly into an aperture 24 that connects the space in the bore 23 with a reflex mirror chamber 25. A reflex mirror 26 is pivotally positioned in the chamber 25 and light entering the chamber 25 through the camera lenses 16 and 20 will strike the mirror 26 for focusing and will pass under the mirror 26 for taking pictures. The lenses 16 and 20, the bores 13, 15, 19, 21 and 23 and the chamber 25 are all optically aligned in the camera housing 12.

Extending upwardly from the reflex mirror chamber 25 is a vertical bore 27 which has a tubular sleeve 28 therein. A focusing lens 29 with a graticule on its lower surface is positioned in the bore 27 above the sleeve 28. Above the lens 29 is an eye-piece mirror 30 that receives light from the reflex mirror 26 for focusing and redirects the light into an eye-piece bore 31 which houses an adjustable eye-piece lens 32.

For focusing the camera 10, the light entering the forward camera lens 16 from a subject is directed through the bores 15 and 13, into the chamber 17, through the rear camera lens 20, through bores 21 and 23, and aperture 24, against the reflex mirror 26, up and through the bore 27 and the lens 29, against the eye-piece mirror 30, and through the lens 32 and the eye-piece bore 31 from whence it is visually observed by the operator.

To the right of the reflex mirror 26 is another bore 33 in alignment axially with the bores 21 and 23 and the aperture 24. Extending to the right of the bore 33 is a film chamber or housing 34. The film housing 34 includes a bore 35 that extends further to the right from bore 33 and terminates at its right end in a film back-stop 36. A film 37 is positioned against the back-stop 36 for taking pictures.

It should be noted that lines joining the peripheral portions of the forward camera lens 16 and the film back-stop 36 form a camera tube or tubular portion in which the lamp 11 is positioned. When the tubular portion is aimed at an eye interior to be photographed, the operator can focus the camera with lamp 11 flickering at low light intensity or take a picture with relatively more intense light. The tubular portion includes the lenses 16 and 20 which are directed at the film chamber 34 and the lamp 11 which is in the tubular portion in a position between the lens 16 and the film chamber 34 to directly illuminate the eye being photographed. The reflex mirror 26 is also in the tubular portion.

The reflex mirror 26 is fastened to a mirror pivot plate 38 which is rotatable on a shaft 39 located above the optical axis of the lenses 16 and 20. When the pivot plate 38 is raised for taking a picture, light entering the reflex mirror chamber 25, instead of being redirected upwardly by the reflex mirror 26 as in focusing, enters the film housing 34. The operative connections for the pivot plate 38 will be considered later.

Of particular importance to the present invention is the electronic light source or lamp 11. The lamp 11 is shown (Figs. 1 and 2) vertically situated relative to the optical axis of the camera lenses 16 and 20. The lamp 11 is shown above the optical axis for illustrative purposes only and may be situated below the axis or on either side of the axis as desired. If a circular lamp 11a is used (Fig. 3), the lamp is positioned in circumscribing relation about the optical axis.

The lamp 11 includes a tubular transparent casing 40 (Fig. 2) that is shown curved along its length to be uniformly spaced from the optical axis. Both ends 41 and 42 of the casing 40 are sealed and are provided with conductors 43 and 44 respectively that extend therethrough and are fastened to electrodes 45 and 46 inside the casing 40. One of the electrodes 45 or 46 constitutes an anode, and the other the cathode. The casing 40 is usually filled with xenon gas or some other gas which gives off light when properly excited.

In Fig. 1 an autotransformer 47 is shown above the lamp 11. The autotransformer 47 is used to excite a control grid (applied to the outer surface of the lamp 11) for ionizing the gas inside.

A variation of the lamp 11 of Fig. 2 is shown in Fig. 3. The suffix "a" has been used in Fig. 3 to indicate corresponding parts. The chief difference between the lamps 11 and 11a is in the over-all shape. The lamp 11a being nearly annular provides a ring of light instead of a relatively shorter segment as with the lamp 11. A smaller segment of light enables the operator to more easily fit the whole segment into the iris of an eye which in some cases will improve the results by eliminating light reflections from the forward eye surfaces.

In order to prevent the inadvertent exposure of the film 37, it is necessary that shields or masks be provided to prevent light from reaching the film directly from the lamp 11 or by light reflections anywhere in camera 10. For this purpose a mask 48 is provided which extends around the right side of the lamp 11. Materials such as electrical tapes, plastics, and formed asbestos have been successfully used for the mask 48.

Another mask 49 extends rightwardly from the rear camera lens housing 18 into the bores 21 and 22. The mask 49 is tubular in shape and is axially aligned with the optical axes of the camera lenses. One or both of the ends of the mask 49 may be partially enclosed to further reduce the possibility of reflected light reaching the film 37.

Fig. 5 shows a solenoid housing 50, the function of which will be described in greater detail later. The solenoid housing 50 is mounted on the right end of the camera 10 in the proximity of the reflex mirror chamber 25. Included in housing 50 is a solenoid coil or winding 51 and a movable solenoid core 52. The core 52 is positioned in the winding 51 and is capable of moving relative thereto in response to electrical energization. Connected to the lower end of the solenoid core 52 is a lever arm 53 that is fastened near one end to a pull rod 54. The pull rod 54 has its other end connected to the reflex mirror pivot plate 38. For focusing, the solenoid coil 51 is de-energized allowing the reflex mirror 26 to fall to its downward position (solid lines).

For taking pictures the solenoid coil 51 is energized and the core 52 moves to its upward position. In this position the reflex mirror 26 is above the optical axis (dotted lines).

Extending vertically upward from the left end of the lever arm 53 is a switch-operating post 55. The post 55 moves an operating arm 56 on a microswitch 57 upwardly when the solenoid coil 51 is energized.

A spring restored three pole, double throw switch 58, which will be described in more detail later, is mounted on the camera 10 near the solenoid housing 50. The switch 58 is operated for taking a picture. The pull rod 54 can be connected directly from the switch 58 to the reflex mirror pivot plate 38 for moving the reflex mirror upwardly as the switch 58 is being operated instead of being moved by the solenoid core 52. This eliminates the need for the solenoid housing 50 and the elements therein (Fig. 1).

Also a conventional hand focusing knob 59, positioned below the right end of the camera 10 is provided for focusing the camera.

A connector plug 111 is positioned in a removable housing plate 112 for electrically connecting the lamp 11 into the rest of the circuit. The removable housing plate 112 is fastened to the housing 12 by screws 113 and affords convenient means for access to the inside of the camera.

Extending downwardly from the camera is a support 114 with suitable positioning adjustments for holding the camera steady.

*Electrical flash circuit*

Having described in detail the physical components of the fundus camera, a detailed description of the electrical circuits follows. Reference to Fig. 4 shows an electrical circuit of the general type used with the fundus camera 10 of Fig. 1.

Briefly, the circuit is most easily thought of as two circuits operated from a common transformer, and connected together by means of a common switch and relay so that either circuit can be connected to the lamp 11 depending on the function to be performed.

The principal purposes of the electrical circuit are (1) to flicker the electronic flash lamp 11 for focusing, (2) to flash the electronic flash lamp 11 relatively more brightly for taking pictures, and (3) to energize and de-energize the solenoid coil 51 for raising and lowering the reflex mirror 26 synchronously with triggering the flash lamp for taking pictures.

The circuit for illuminating the electronic lamp 11 for taking pictures will be considered first since it involves parts that are duplicated in the focusing circuits. Power is introduced into the circuits from an external power supply by means of the wires 61 and 62 which are connected to opposite ends of primary winding 63 of transformer 64. A neon bulb 65 across the winding 63 indicates when a main line switch 66 is turned on.

The transformer 64 is shown having four secondary windings 67, 68, 69 and 70. The winding 67 is a high voltage winding and is used primarily for the charging of the flash capacitor 73. A number of parallel circuits are connected to the output of the winding 67. One of the principal of these is from the upper side of the winding 67, through a half wave rectifier 71, through a resistor 72, the capacitor 73, and back to the winding 67. This circuit, when energized, builds up a large charge on the capacitor 73 which is used for flashing the lamp 11.

A bleeder resistor 74, and a voltage divider circuit made up of resistors 75, 76 and 77 are in parallel across the main flash capacitor 73. A neon bulb 78 and a capacitor 79 are across the divider resistor 75 providing means by which the operator can tell when the capacitor 73 is sufficiently charged. A safety discharge switch 80 is also in parallel in the circuit for discharging the capacitor 73 through resistor 72 when the camera is turned off, if desired. The output of the high voltage circuit is connected to the anode or plate electrode 45 in the electronic lamp 11 through a relatively large resistor 81. The cathode or low potential electrode 46 in the lamp 11 is connected to the low voltage side of the capacitor 73, which is common with secondary windings of the transformer 64 to complete the parallel circuits from the secondary winding 67.

The resistor 81 isolates the flash circuit which is indicated generally in Fig. 4 by the elements numbered 67, 71 to 80 and 93 from the flicker circuit which is indicated by the elements numbered 68, 69, 70 and 94 to 106 inclusive because these circuits usually operate at different voltages. When lamp 11 is ionized by the flicker circuit, the resistor 81 also prevents the discharge of the capacitor 73 through the lamp 11.

A relay 82 with two stationary terminals 83 and 84, and a transfer terminal 85 is provided to short out the resistor 81 for taking pictures and to disconnect the flicker circuit. A relay coil 86 having one side connected to the secondary winding 70 in transformer 64 has its other side connected to a movable switch arm 87 in the switch 58. A stationary terminal 89 in the switch 58 is connected to the opposite side of the secondary winding 70 and coacts with the movable switch arm 87 when the switch 58 is operated. Therefore, when the switch 58 is operated a circuit is available to energize the relay coil 86 and transfer the terminal 85 from the stationary terminal 84 to the stationary terminal 83 for shorting the resistor 81.

Another movable terminal 90 in the switch 58 coacts with a stationary switch terminal 91 to complete a circuit from the secondary winding 70 for energizing the solenoid winding 51. As described above, the solenoid winding 51, when energized, moves the reflex mirror 26 up for taking pictures and also operates the micro-switch 57.

The function of the micro-switch 57 is to induce a high grid potential on a grid 92 of the lamp 11 for illuminating the lamp to brillance.

A capacitor 93 has one side connected between the voltage divider resistors 76 and 77 and another side connected to an intermediate position on the autotransformer 47. One side of the coils 47 is connected to the common of the transformer 64 secondaries and to the lamp cathode 46. This circuit produces a voltage across the capacitor 93 equal to the value of the voltage across the voltage divider resistor 77 which will remain constant when the capacitor 73 is fully charged. Because no direct current flows through a capacitor, there will be zero potential on the grid 92 relative to the cathode 46 as long as the capacitor 93 remains charged.

Closing the micro-switch 57 grounds the positively charged plate of the capacitor 93. Since the potential across a capacitor cannot change instantaneously, the capacitor plate which was formerly at ground is now negative by the amount of potential across the capacitor. This potential difference is placed across primary 47a of autotransformer 47. The capacitor 93 then starts discharging through the primary impedance of autotransformer 47. In this way a negative pulse is produced in the primary 47a of the autotransformer 47. The pulse width is relatively short since the capacitor 93 is small and so is the internal impedance of the autotransformer 47 to the pulse. The autotransformer 47 steps up the voltage of the pulse in the primary 47a to a very high voltage in the secondary. This voltage ionizes the gas in the lamp 11, lowering the internal impedance of the lamp 11 to almost zero and causing a tremendous current to flow from the capacitor 73 through the lamp 11 producing the desired light.

*Electronic focusing circuit*

For focusing, the switch 58 is in the position shown in Fig. 4 with the relay 82 de-energized and the transfer terminal 85 engaged with the stationary terminal 84.

A full wave vacuum tube rectifier 94, has plates 95 and 96 connected to ends of the secondary winding 68 of the transformer 64. The secondary winding 69 is connected across a heater-cathode 97 of the tube 94. The output of the rectifier is connected across a capacitor 98 which has one side connected to a center tap 99 on the secondary winding 68 and another side connected to the cathode 97 through a resistor 100. This is a conventional vacuum tube full wave rectifier circuit. The positive side of the rectifier output is connected to the plate 45 of the electronic lamp 11 through the normally closed relay terminals 84 and 85.

The rectifier output is also connected to a movable terminal 101 on a flicker-focus switch 102. When the switch 102 is actuated for focusing, the rectified output is fed to a plate 103 of a thyratron connected as a relaxation oscillator tube 104 through a resistor 105. The plate 103 is also connected to a capacitor 106 which has its other side connected to the intermediate tap of the autotransformer 47 through transfer terminal 107 and stationary terminal 108 on the switch 58.

Various other resistors and capacitors are provided in the circuit of the oscillator tube 104 for determining the frequency of its oscillations. Since this is a conventional oscillating circuit and not particularly important, as such, to the present invention only the generally operating characteristics of the circuit are considered in this specification.

It is sufficient for the spectification to note that the capacitor 106 will charge up when direct current is applied from the rectifier circuit. Each time the tube 104 fires, the capacitor 106 will discharge through the tube 104 and the primary 47a of the autotransformer 47. The voltage across the primary of the autotransformer 47 is transformed and appears on the grid 92 and ionizes the gas in lamp 11. This allows the capacitor 98 to discharge through lamp 11. Because less energy is stored in capacitor 98 than in capacitor 73, the flashes for focusing are much less brilliant than the flash used to take the picture.

The length of time between successive discharges of the tube 104 is a function of the size of the various elements used in the tube circuit. The successive discharges of tube 11 appears as a visable light flickering about 60 times a second which is well above the flicker fusion frequency of the normal eye, and so appears to be a constant light.

A neon bulb 109 is connected between a stationary terminal 110 on the flicker switch 102 and the transformer common for indicating that switch 102 is turned on.

*Operation*

The present fundus camera is simple to operate and requires little skill in order to obtain good pictures. The camera is first turned on by the switch 66. A brief warm up period is necessary while the voltage builds up on the capacitor 73. When the voltage is sufficiently high the neon bulb 78 will glow. The patient is comfortably positioned in a chin and forehead rest and a fixation light is turned on for the patient to look at.

The operator actuates the flicker focus switch 102 which supplies plate voltage to the relaxation oscillator tube 104 and causes the camera lamp 11 to intermittently flash at relatively low intensity for focusing. While the flickering takes place, the operator focuses the image from the lamp 11 in the periphery of the patient's pupil. The operator then looks into the focusing bore 31 and when the camera is properly adjusted, the operator actuates the switch 58 for taking the picture. When actuated, the switch 58 shorts out the resistor 81 to supply high voltage to the plate 45 of the lamp 11 by energizing the relay 82. The switch 58 also energizes the solenoid 50 which raises the reflex mirror 26, and then when the mirror 26 is out of the way operates the micro-switch 57 for applying a high voltage on the grid 92 of the lamp 11. Having taken the picture, the operator turns off the camera by the switches 102 and 66, and if desired may remove the voltage on the capacitor 73 by actuating the safety discharge switch 80.

From the foregoing description of the camera, the circuits, and the operation, it is apparent that many changes could be made without departing from the spirit of the invention.

Particular among the changes which bears closely on the invention is the shape and size of the lamp 11 and its location in the camera 10. Satisfactory results have been obtained with a short lamp 11 positioned near the optical axis and also with a relatively long circular lamp 11a which substantially circumscribes the axis. Between these limits varying length lamps may be used without departing from the scope of the invention. A short length lamp has the advantage of producing a smaller image which is sometimes easier to fit completely into the pupil of the eye.

It is also anticipated that a small mask could be placed between the lamp 11 and the lens 16 in the camera in order to overcome reflections due to the mirror effect of the surfaces of lens 16. These reflections produce a small central artifact or over exposed portion on the film 37.

This invention is intended to cover all changes and modifications of the example of the invention herein chosen for purposes of disclosure, which do not constitute departures from the spirit and scope thereof.

What I claim is:

1. A camera for photographing an interior region of an eye through the lens of the eye comprising a housing having an ophthalmoscope lens mounted in an opening in one end thereof, said ophthalmoscope lens having an optical axis that extends to the eye being photographed, a camera lens mounted in said housing and having an optical axis aligned with the optical axis of the ophthalmoscope lens, a film chamber positioned in the housing opposite said ophthalmoscope lens, said ophthalmoscope lens and said camera lens defining an optical path that extends between the eye being photographed and the film chamber, an electronic flash light source mounted inside the camera in the optical path between the ophthalmoscope lens and the film chamber, said light source being in direct optical communication with the lens of the eye being photographed, masking means associated with the light source and positioned on the side thereof closest to the film chamber to prevent light from the light source from entering the film chamber directly, and electronic means connected to the light source including means for exciting said source to produce a flash of light of sufficient intensity for taking pictures of the interior region of the eye.

2. The camera set out in claim 1 in which said electronic means includes a high energy circuit for exciting said electronic flash light source to a brightness sufficient for taking pictures of the interior region of the eye and a low energy circuit including circuit interrupting means for exciting said same flash light source to relatively less light intensity sufficient for focusing the camera on the interior region of the eye.

3. The camera defined in claim 1 wherein said electronic flash light source is annular and is positioned inside the camera in circumscribing relationship with the aligned axes of said ophthalmoscope lens and said camera lens.

4. A camera for photographing an interior region of an eye through the lens of the eye comprising a housing having an ophthalmoscope lens mounted in an opening in one end thereof, said ophthalmoscope lens having an optical axis that extends to the eye being photographed, a camera lens mounted in said housing and having an optical axis aligned with the optical axis of the ophthalmoscope lens, a film chamber positioned in the housing opposite said ophthalmoscope lens, said ophthalmoscope lens and said camera lens defining an optical path that extends between the eye being photographed and the film chamber, an electronic flash light source mounted inside the camera in the optical path between the ophthalmoscope lens and the film chamber, said light source being positioned adjacent to the aligned optical axes of said ophthalmoscope lens and said camera lens and being in direct optical communication with the lens of the eye being photographed, masking means associated with the light source and positioned on the side thereof closest to the film chamber to prevent light from the light source from entering the film chamber directly, and electronic means connected to the light source including means for exciting said source to produce a flash of light of sufficient intensity for taking pictures of the interior region of the eye.

5. A camera for photographing an interior region of an eye through the lens of the eye comprising a housing having an ophthalmoscope lens mounted in an opening in one end thereof, said ophthalmoscope lens having an axis that extends to the eye being photographed, a camera lens mounted in said housing and having an optical axis aligned with the optical axis of the ophthalmoscope lens, a film chamber positioned in the housing opposite said ophthalmoscope lens, said ophthalmoscope lens and said camera lens defining an optical path that extends between the eye being photographed and the film chamber, an electronic flash light source mounted inside the camera in the optical path between the ophthalmoscope lens and the film chamber, said light source being positioned on the aligned optical axes of said ophthalmoscope lens and said camera lens and being in direct optical communication with the lens of the eye being photographed, masking means associated with the light source and positioned on the side thereof closest to the film chamber to prevent light from the light source from entering the film chamber directly, and electronic means connected to the light source including means for exciting said source to produce a flash of light of sufficient intensity for taking pictures of the interior region of the eye.

References Cited in the file of this patent

UNITED STATES PATENTS

| | | |
|---|---|---|
| 1,311,185 | Silverman | July 29, 1919 |
| 1,605,725 | Herbert | Nov. 2, 1926 |
| 1,741,526 | Kuhl | Dec. 31, 1929 |
| 2,006,007 | Zimmer | June 25, 1935 |
| 2,178,423 | Inman | Oct. 31, 1939 |
| 2,441,370 | Pearce | May 11, 1946 |
| 2,586,973 | McMillin | Feb. 26, 1952 |
| 2,609,523 | Stein et al. | Sept. 2, 1952 |
| 2,635,216 | Hobbs | Apr. 14, 1953 |
| 2,691,918 | Robbins et al. | Oct. 19, 1954 |

FOREIGN PATENTS

| | | |
|---|---|---|
| 12,885 | Great Britain | of 1912 |
| 167,902 | Great Britain | Aug. 25, 1921 |
| 481,182 | Italy | May 23, 1953 |

(Other references on following page)

OTHER REFERENCES

American Journal of Ophthalmology, Edwards, vol. 35 (June 1952), pages 851–854.

Review of Scientific Instruments, Jacobs et al., vol. 24, Issue No. 1, January 1953, pages 52–55.

British Journal of Ophthalmology, Hansell et al., vol. XXVII, No. 2 (February 1953), pages 65–69.

The Journal of Photographic Science, Jeffreys, vol. 1, Nos. 1–6, pages 184–192, 1953.

American Journal of Ophthalmology, Drews vol. 44, Issue No. 2 (August 1957), pages 170–177. Only pps. 171, 173, 174 and 177 relied on.